· US007909990B2

(12) United States Patent
Takahashi et al.

(10) Patent No.: US 7,909,990 B2
(45) Date of Patent: Mar. 22, 2011

(54) FILTER DEVICE

(75) Inventors: Kazuaki Takahashi, Iruma (JP);
Junichi Nakamura, Iruma (JP)

(73) Assignee: Takahashi Co., Ltd., Iruma-shi, Saitama (JP)

( * ) Notice: Subject to any disclaimer, the term of this patent is extended or adjusted under 35 U.S.C. 154(b) by 1364 days.

(21) Appl. No.: 10/481,227

(22) PCT Filed: Nov. 26, 2002

(86) PCT No.: PCT/JP02/12336
§ 371 (c)(1),
(2), (4) Date: Dec. 16, 2003

(87) PCT Pub. No.: WO03/045569
PCT Pub. Date: Jun. 5, 2003

(65) Prior Publication Data
US 2004/0206678 A1    Oct. 21, 2004

(30) Foreign Application Priority Data

Nov. 27, 2001  (JP) .................................. 2001-360757
Nov. 25, 2002  (JP) .................................. 2002-340932

(51) Int. Cl.
*B01D 17/12*  (2006.01)
*B01D 17/038*  (2006.01)

(52) U.S. Cl. .......... 210/86; 209/729; 209/733; 209/734; 210/94; 210/138; 210/175; 210/192; 210/223; 210/295; 210/512.2; 210/512.3; 210/513

(58) Field of Classification Search .............. 210/512.1, 210/512.2, 512.3, 513, 96.1, 138, 175, 182, 210/222, 223, 86, 94, 192, 295; 209/728, 729, 732–734, 725–727, 730, 731
See application file for complete search history.

(56) References Cited

U.S. PATENT DOCUMENTS

| 2,102,525 | A | * | 12/1937 | Freeman |
| 2,931,504 | A | * | 4/1960 | Troland ........................ 209/731 |
| 3,235,090 | A | * | 2/1966 | Bose et al. ................. 210/512.1 |
| 3,568,847 | A | * | 3/1971 | Carr ........................... 210/512.1 |

(Continued)

FOREIGN PATENT DOCUMENTS

JP    36-6342    5/1961

(Continued)

*Primary Examiner* — Joseph W Drodge
(74) *Attorney, Agent, or Firm* — Flynn, Thiel, Boutell & Tanis, P.C.

(57) ABSTRACT

A filter device is made up of: a filter portion having a fluid outlet at its axis, and a fluid inlet in a position away from the axis, in which a fluid containing particles is supplied at a predetermined flow speed from the fluid inlet to cause a swirling, particles are moved outward in a centrifugal state and the fluid from which the particles are separated is discharged from the fluid outlet, and the particles separated by slowing down the swirling are allowed to sink; and a settlement portion in which the particles that settle in the filter portion are allowed to settle. Thus, a fluid containing particles is supplied at a predetermined flow speed to cause swirling, the particles are separated by a centrifugal force caused by the swirling and allowed to sink and settle, and the fluid from which the particles are separated is discharged. A large amount of particles can be allowed to settle and be reliably removed in a short time with this small-sized and simple device. The filter device does not clog, does not need washing and exchanging work and keeps the costs low.

19 Claims, 22 Drawing Sheets

U.S. PATENT DOCUMENTS

| | | | | |
|---|---|---|---|---|
| 3,849,246 A | * | 11/1974 | Raymond et al. | 162/4 |
| 3,862,041 A | * | 1/1975 | Robinson | 210/512.2 |
| 4,437,984 A | * | 3/1984 | King et al. | 209/728 |
| 4,587,024 A | * | 5/1986 | Hayatdavoudi | 210/739 |
| 4,650,584 A | * | 3/1987 | Macierewicz | 210/512.2 |
| 4,729,837 A | * | 3/1988 | Henricson | 210/784 |
| 6,109,451 A | * | 8/2000 | Grimes | 209/725 |
| 6,355,178 B1 | * | 3/2002 | Couture et al. | 210/748 |

FOREIGN PATENT DOCUMENTS

| | | |
|---|---|---|
| JP | 53-4379 | 1/1978 |
| JP | 60-139394 | 7/1985 |
| JP | 63-126051 | 8/1988 |
| JP | 64-43361 | 2/1989 |
| JP | 2001-137743 | 5/2001 |

* cited by examiner (a)

(b)

(a)

(b)

(a)

(b)

(a)

(b)

FILTER DEVICE

TECHNICAL FIELD

The present invention relates to a filter device that separates and removes particles contained in a fluid, such as fine powdery dust.

BACKGROUND ART

For example, in a machining apparatus, cutting is performed, while supplying a cutting fluid from a feed tank, and the cutting fluid contains cutting dust in a fine powdery form. The cutting fluid containing fine powdery cutting dust is supplied to the filter device, and the filter device removes the cutting dust and returns the cutting fluid to the feed tank (for example, see Patent Document 1).

Patent Document 1: Japanese Patent Application Laid-Open No. 2001-137743 (pp. 1 to 5, FIGS. 1 to 3)

As such a filter device, for example, there are filter devices that remove cutting dust by a filter film or remove cutting dust by settlement. However, both devices have a problem in that the fine powdery cutting dust contained in the cutting fluid in a large amount cannot be reliably removed in a short time by a small-sized device.

Moreover, the filter film may clog, and when the filter film clogs, the filter device must be disassembled to clean the filter film. Therefore, the filter device needs washing and exchanging work, when the filter device becomes unserviceable.

Furthermore, when the filter film is used repetitively, the filtering accuracy deteriorates, and becomes likely to clog. Therefore, almost all filter films are disposable filter films, and hence there is a problem of cost increase.

In view of the above situation, it is a first object of the present invention to provide a filter device that can separate and reliably remove a large amount of particles in a short time by a small-sized device. It is a second object of the present invention to provide a filter device, which does not need washing and exchanging work, and keeps costs low.

DISCLOSURE OF THE INVENTION

The present invention is a filter device comprising: a filter portion having a fluid outlet at its axis, and a fluid inlet in a position away from the, in which a fluid containing particles is supplied at a predetermined flow speed from the fluid inlet to cause swirling, particles are moved outward in a centrifugal state and the fluid from which the particles are separated is discharged from the fluid outlet, and the particles separated by slowing down the swirl are allowed to sink; and a settlement portion in which the particles that settle in the filter portion are allowed to settle.

In this filter device, a fluid containing particles is supplied at a predetermined flow speed to cause swirling, the particles are separated by the centrifugal force caused by the swirling and allowed to sink and settle, and the fluid from which the particles are separated is discharged. A large amount of particles can be allowed to settle and be reliably removed in a short time with this small-sized and simple device. The filter device does not clog, does not need washing and exchanging work and keeps the costs low.

The filter portion is formed such that closed barrels having a tapered bottom are provided in a plurality of stages, the closed barrel on the uppermost stream side is provided with a fluid inlet at the side away from the axis and a fluid outlet at a portion corresponding to the axis. The fluid containing particles is supplied at a predetermined flow speed to cause swirling, the swirling is slowed down by the plurality of closed barrels to allow the particles to sink and settle, and the fluid from which the particles are separated is discharged.

The filter portion is constructed by connecting the closed barrels formed separately in a plurality of stages, and hence the filter portion can be easily manufactured. Moreover, a pair of blocks may be joined to provide the closed barrels in a plurality of stages, so that the filter portion can be easily manufactured.

The filter portion may be constructed such that the closed barrels are stacked in a plurality of stages, so that particles are allowed to sink from the closed barrel on the uppermost stream side located at the innermost position to the closed barrel on the lowermost stream side located at the outermost position. As a result, the filter portion can be made short, so that a small-sized and simple device can be obtained.

The filter portion may be constructed by forming the closed barrel integrally with a barrel, thereby improving the airtightness of the filter portion.

In the filter portion, an obstacle may be arranged on the axis, so that particles separated by the obstacle can be allowed to sink without missing any particles, thereby improving the separation accuracy and separation efficiency of the particles.

The caliber of the fluid outlet in the filter portion may be constructed to be adjustable, in order to prevent the separated particles from escaping from the fluid outlet, thereby improving the separation accuracy and separation efficiency of particles.

The filter portion has heating means for heating the closed barrels, so as to reduce the viscosity of the fluid by heating the closed barrels, or heating means for heating the fluid inlet, so as to reduce the viscosity of the fluid by heating the fluid inlet. As a result, the centrifugal speed increases, to increase the difference in specific gravity, thereby improving the separation accuracy and separation efficiency of the particles.

The filter portion comprises magnetic force generation means for giving a magnetic force for allowing particles to sink, or ultrasonic wave generation means for giving vibrations for allowing particles to sink, so that particles can be allowed to sink and settle quickly.

The settlement portion according to the present invention is detachable from the filter portion, so that the filter portion is detached to discharge the settled particles at one time.

The settlement portion may have a discharge port for discharging the settled particles, so that the settled particles can be easily discharged from the discharge port.

In this case, a discharge valve is provided in the discharge port, so that the settled particles can be easily discharged from the discharge port by the operation of the discharge valve.

The settlement portion comprises a switching valve on the side communicating with the filter portion, for cutting off communication when the particles settled in the settlement portion are discharged, so that when the particles settled in the settlement portion are discharged, communication with the filter portion is cut off by the switching valve, and the settled particles can be discharged without any leakage of fluid from the filter portion.

The settlement portion has a transparent portion through which visual observation of the settled amount of particles is possible, so that the settled amount of particles can be confirmed by visual observation.

The settlement portion of the present invention comprises drive means for opening or closing the discharge valve, a timer for measuring the time during which the discharge valve is opened, and control means for controlling the drive means based on the timer to open the discharge valve regularly, so that the discharge valve can be regularly opened based on the timer, to discharge the settled particles.

Further, if the settlement portion comprises drive means for opening or closing the discharge valve, detection means for detecting the settled amount of the particles, and control means for controlling the drive means based on the detection information from the detection means to open the discharge valve, the discharge valve can be opened based on the detection information from the detection means, to discharge the settled particles.

BEST MODE FOR CARRYING OUT THE INVENTION

Embodiments of the filter device of the present invention will be described based on the drawings, but the present invention is not limited to those embodiments.

The filter device of the present invention is used for filtering raw materials for pharmaceutical and chemical products, foods and drinks, and other raw materials; for recovering particles such as cutting dust in the automobile, machine tool and processing industries; for filtering circulating water and waste water in respective factories or for water treatment; for removing particles such as impurities in semiconductors and in the bioindustry; and for removing particles, being foreign matter in wash water or solvents, and is widely used for separating and removing particles contained in liquid and gas fluids.

Figure 1:
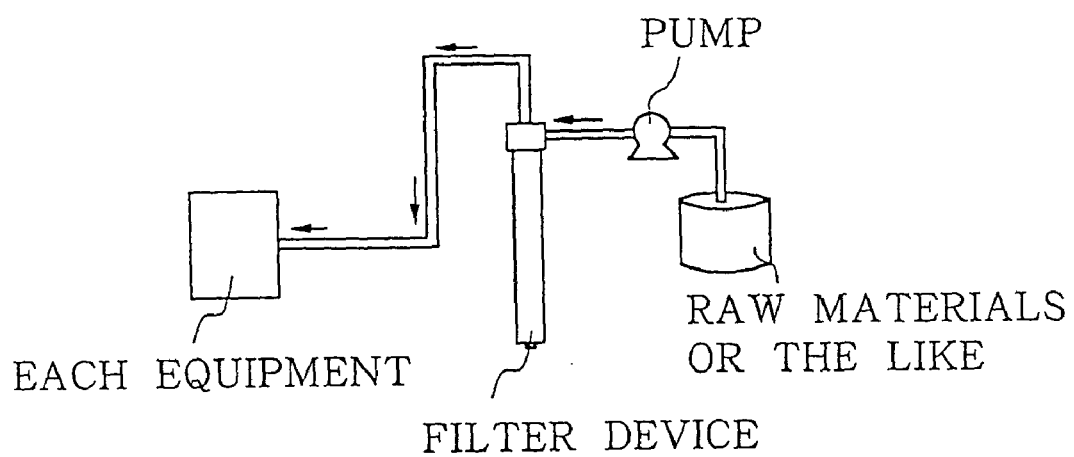
FIGS. 1(a) and (b) are diagrams illustrating the operational mode of a filter device.
Figure 1:
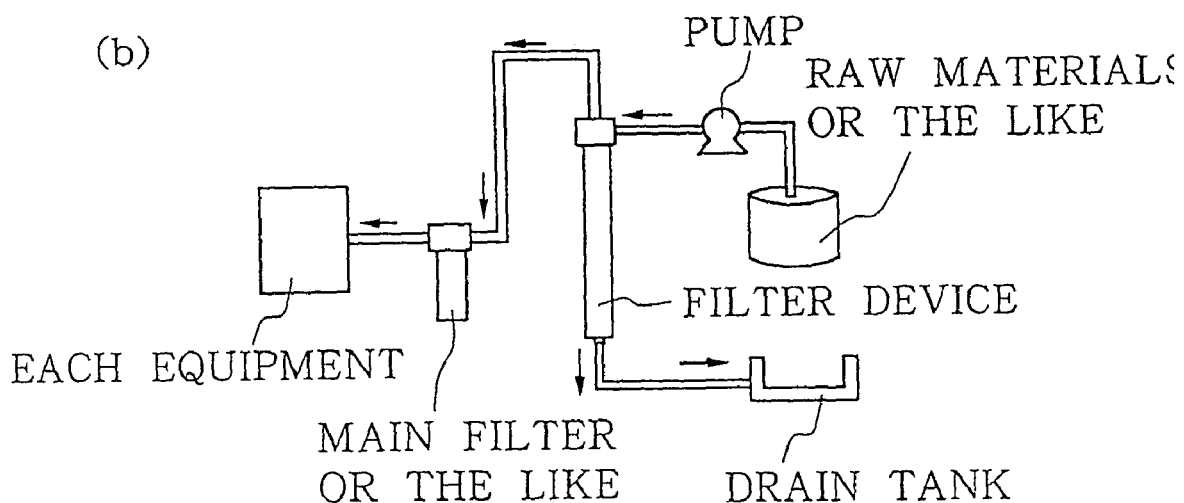

Examples of arrangement of the filter device of the present invention are shown in FIG. 1. In an example shown in FIG. 1(a), the filter device is arranged in a route for supplying raw materials or the like to each equipment by a pump, and the filter device removes particles contained in the raw materials or the like. In an example shown in FIG. 1(b), the filter device is arranged in a route for supplying raw materials or the like to each equipment by a pump, and the filter device removes particles contained in the raw materials or the like, and discharges the separated particles to a drain tank.

In this embodiment, explanation is given for a case where the filter device is used for recovering particles such as cutting dust in machine tools or in the processing industry. In this embodiment, the filter device is used for removing particles of fine powdery dust contained in a liquid as a fluid, but the filter device is also applicable for a case where particles contained in a gas are removed. Further, particles are not limited to fine powdery dust, and any particles can be removed.

Figure 2:
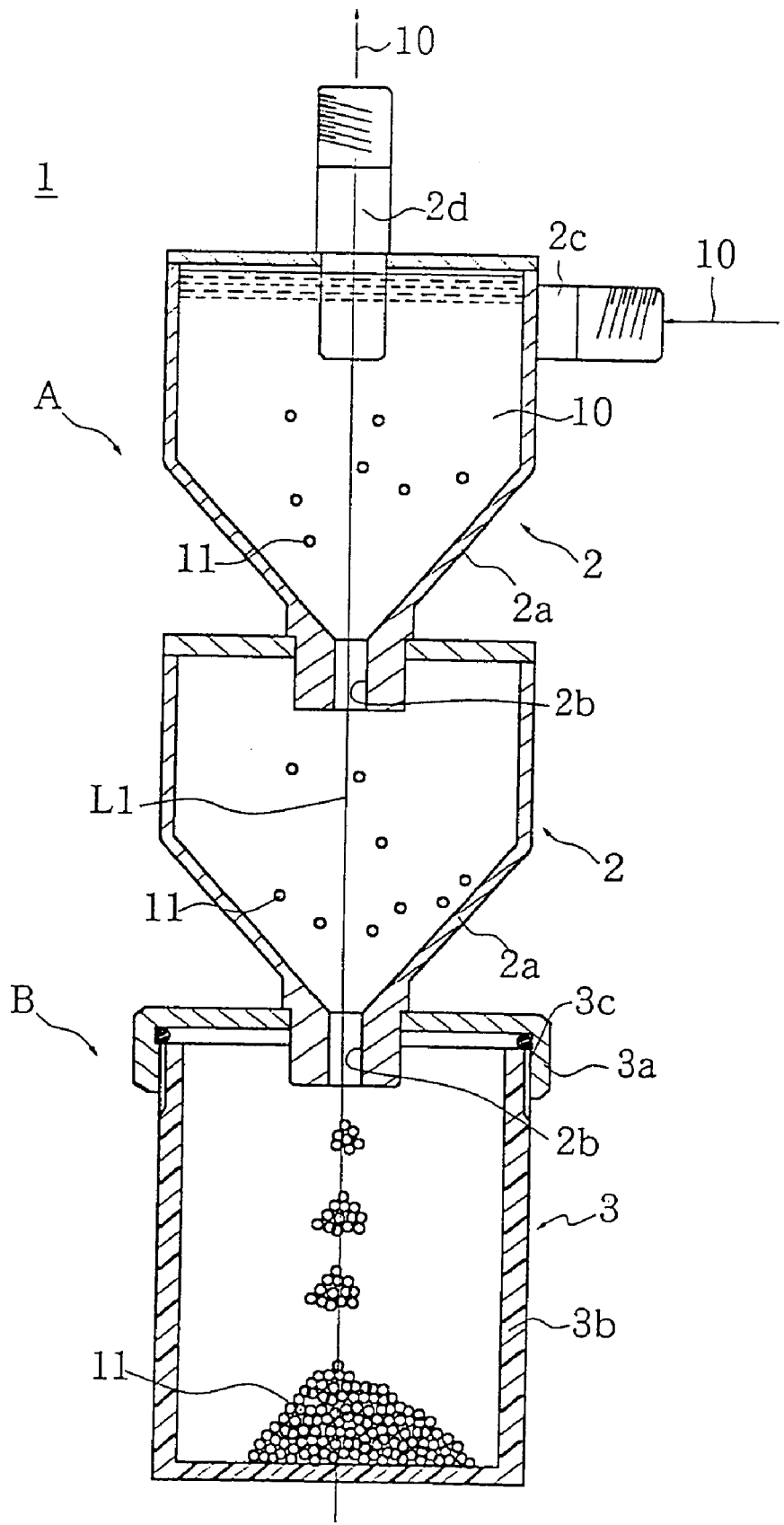
FIG. 2 is a cross section of the filter device.
Figure 3:
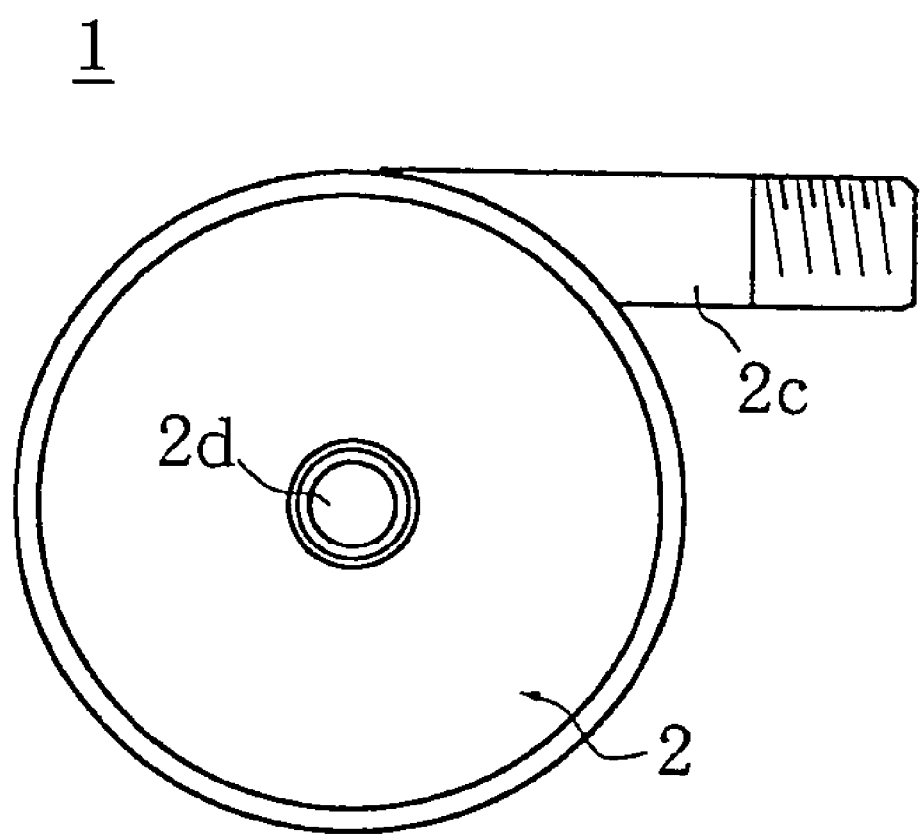
FIG. 3 is a plan view of the filter device.

An embodiment shown in FIG. 2 and FIG. 3 will be described first. FIG. 2 is a cross section of the filter device, and FIG. 3 is a plan view of the filter device.

A filter device 1 in this embodiment has a filter portion A in which closed barrels 2 having a tapered bottom are provided in a plurality of stages, and particles contained in a fluid are allowed to sink, and a settlement portion B in which particles that sink in the filter portion A are allowed to settle. This filter device 1 is arranged, for example, in a system in which cutting is performed while supplying a cutting fluid, being a fluid, and supplies a cutting fluid including fine powdery cutting dust, being particles, to the filter device 1, removes the cutting dust by the filter device 1 and returns the cutting fluid to a supply tank or the like.

In the filter device 1, two closed barrels 2 having a communicating hole 2b in a tapered bottom 2a are connected vertically, but the number thereof is not limited to two, and the construction needs only to have a plurality of closed barrels connected to each other. The closed barrel 2 is a circular barrel in cross section, and is formed of a metal such as aluminum, and is light and has strength.

To the tapered bottom 2a of the lowermost closed barrel 2 is connected a settlement cup 3 constituting a settlement portion B. This settlement cup 3 is constituted of a lid 3a and a cup body 3b, so that the lid 3a is secured to the tapered bottom 2a of the lowermost closed barrel 2, and the cup body 3b is detachably attached to the lid 3a by screws 3c. By detaching the cup body 3b from the lid 3a, particles 11 settled in the cup body 3b can be discharged at one time.

The lid 3a of the settlement cup 3 is formed of a metal such as stainless steel, and secured to the tapered bottom 2a of the lowermost closed barrel 2 by welding. The cup body 3b of the settlement cup 3 is formed of a transparent resin, so that the settlement state of the inside particles 11 can be confirmed from outside.

In the uppermost closed barrel 2, a fluid inlet 2c is provided at a side away from an axis L1, and a fluid outlet 2d is provided on the upper side corresponding to the axis L1, so that a fluid 10 containing particles 11 is supplied at a predetermined flow speed from the fluid inlet 2c, and the fluid 10 from which the particles 11 are separated is discharged from the fluid outlet 2d.

The fluid 10 containing particles 11 is supplied at a predetermined flow speed from the fluid inlet 2c in the uppermost closed barrel 2, to cause swirling in the fluid 10, and a centrifugal state is generated in the closed barrel 2. Due to the action thereof, the particles 11 are moved outward, and the clean fluid from which the particles 11 are removed flows from the central direction towards the fluid outlet 2d. By slowing down the swirling by the plurality of closed barrels 2, the particles 11 sink and are guided to the tapered bottom 2a, and guided by the communicating hole 2b to enter the closed barrel 2 on the lower stage sequentially, and enters the settlement cup 3 from the communicating hole 2b in the lowermost closed barrel 2, so that the particles 11 settle in the settlement cup 3.

As described above, the fluid 10 containing the particles 11 is supplied to the uppermost closed barrel 2 at a predetermined flow speed to cause swirling, and the swirling is slowed down by the plurality of closed barrels 2 to allow the particles 11 to sink, so that the particles 11 reliably settle in the settlement cup 3.

As a result, the fluid 10 from which the particles 11 are separated is discharged from the uppermost closed barrel 2, and the particles 11 can be prevented from being discharged together from the fluid outlet 2d, and hence a large amount of particles 11 can be allowed to settle and be reliably removed in a short time by a small-sized and simple device.

Since the filter portion A in this embodiment is constructed by connecting the closed barrels 2 formed separately in a plurality of stages, the filter portion A can be easily manufactured.

Figure 4:
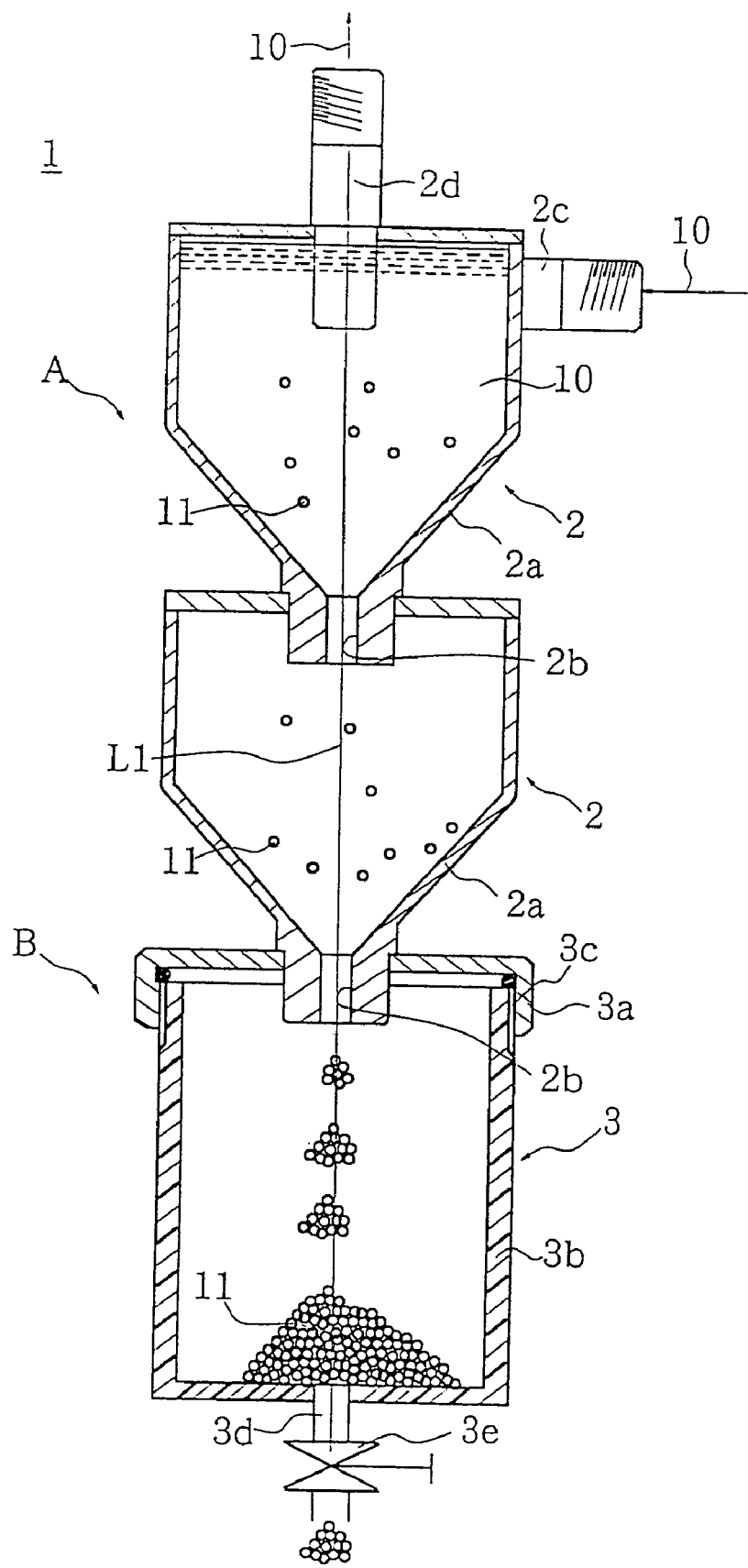
FIG. 4 is a cross section of the filter device.

An embodiment shown in FIG. 4 will be described next. FIG. 4 is a cross section of the filter device. The filter device 1 in this embodiment has a filter portion A in which closed barrels 2 having a tapered bottom are provided in a plurality of stages, and particles contained in a fluid are allowed to sink, and a settlement portion B in which particles sink in the filter portion A is allowed to settle, and is constructed as in the embodiment shown in FIG. 2 and FIG. 3. In this embodiment, however, there is provided a discharge port 3d for discharging the particles settled in the settlement cup 3 in the settlement portion B. A discharge valve 3e is provided in this discharge port 3d, so that the settled particles can be easily discharged from the discharge port 3d, by a manual operation of the discharge valve 3e.

Figure 5:
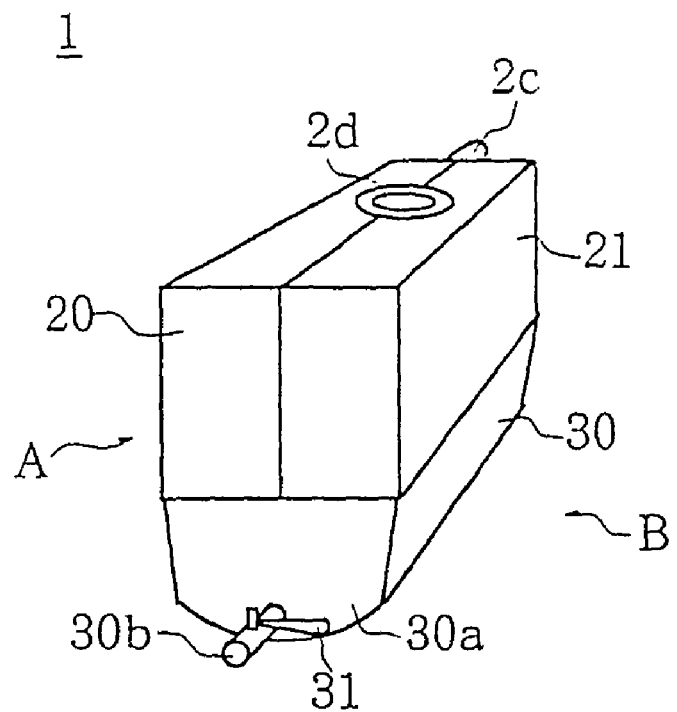
FIG. 5 is a perspective view of the filter device.
Figure 6:
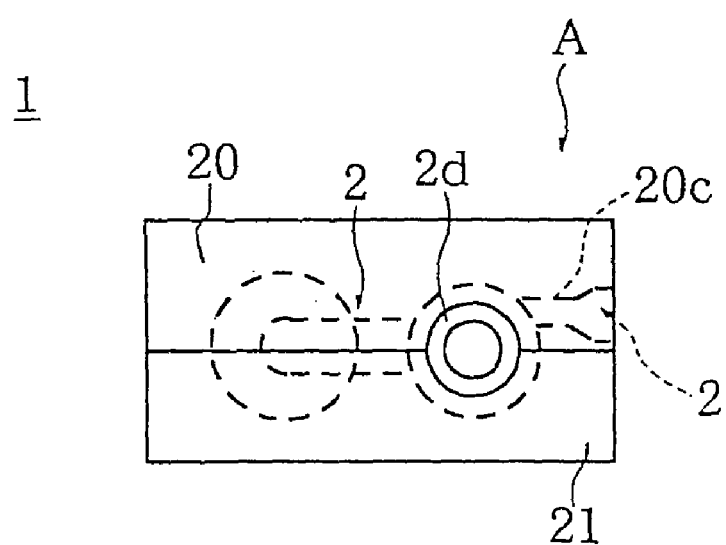
FIG. 6 is a plan view of the filter device.
Figure 7:
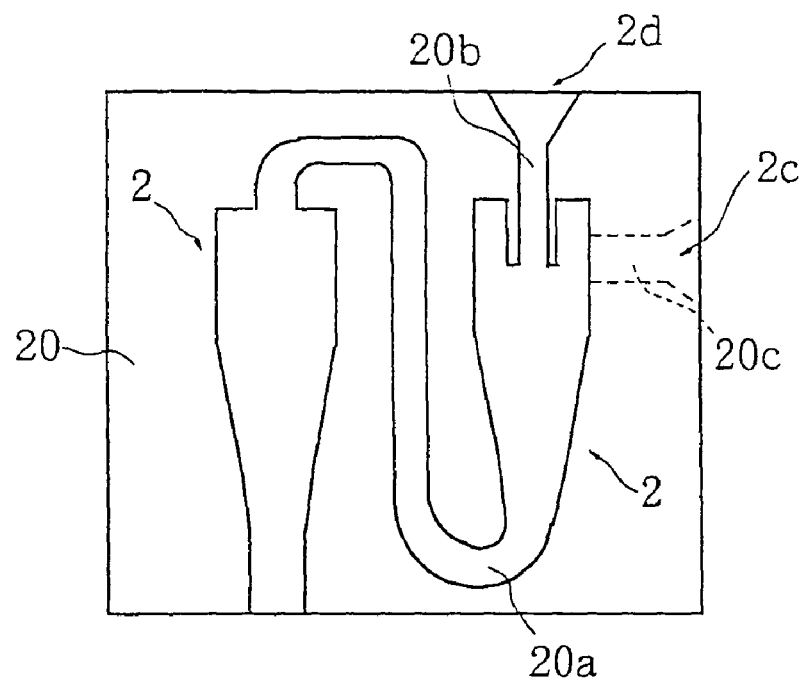
FIGS. 7(a) and (b) are diagrams of a block constituting the filter portion.
Figure 7:
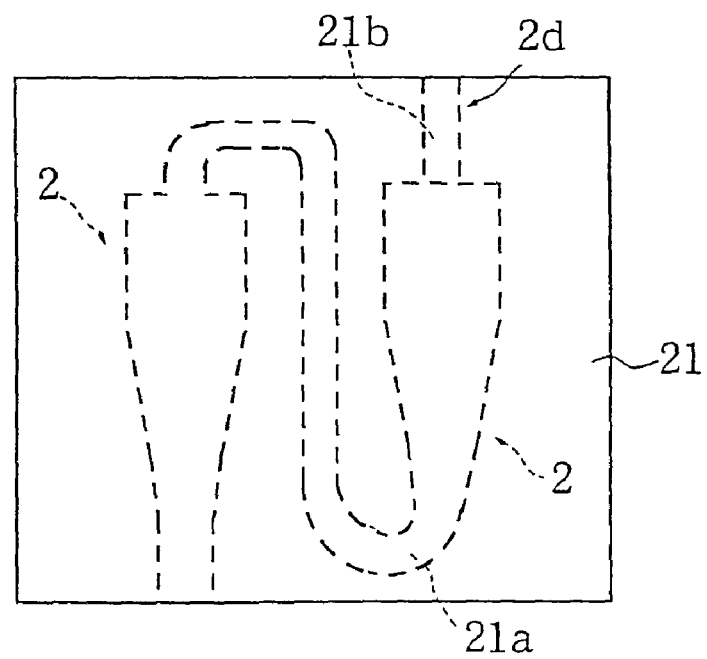

An embodiment shown in FIG. 5 to FIG. 7 will be described next. FIG. 5 is a perspective view of the filter device, FIG. 6 is a plan view of the filter device, and FIG. 7 is a diagram of a block constituting the filter portion.

In the filter device 1 in this embodiment, concave portions 20a and 21a for providing the closed barrels 2 in a plurality of stages are formed, and concave portions 20b and 21b for providing the fluid outlet 2d are formed, on the side where a pair of blocks 20 and 21 is joined. Further, in a block 20, a through hole 20c for providing the fluid inlet 2c is formed, penetrating the concave portion 20a, and the filter portion A is constructed such that the pair of blocks 20 and 21 is joined to provide the closed barrels 2 in a plurality of stages.

In this manner, by providing the closed barrels 2 in a plurality of stages by joining a pair of blocks 20 and 21, the filter portion A can be easily manufactured by die-cutting the pair of blocks 20 and 21.

Below the filter portion A, the settlement portion B is fixedly provided. The settlement portion B is constituted of a settlement tank 30, and a discharge port 30b for discharging particles settled in the bottom 30a of the settlement tank 30 is provided. A discharge valve 31 is provided in the discharge port 30b, and the settled particles can be easily discharged from the discharge port 30b by the manual operation of the discharge valve 31.

Figure 8:
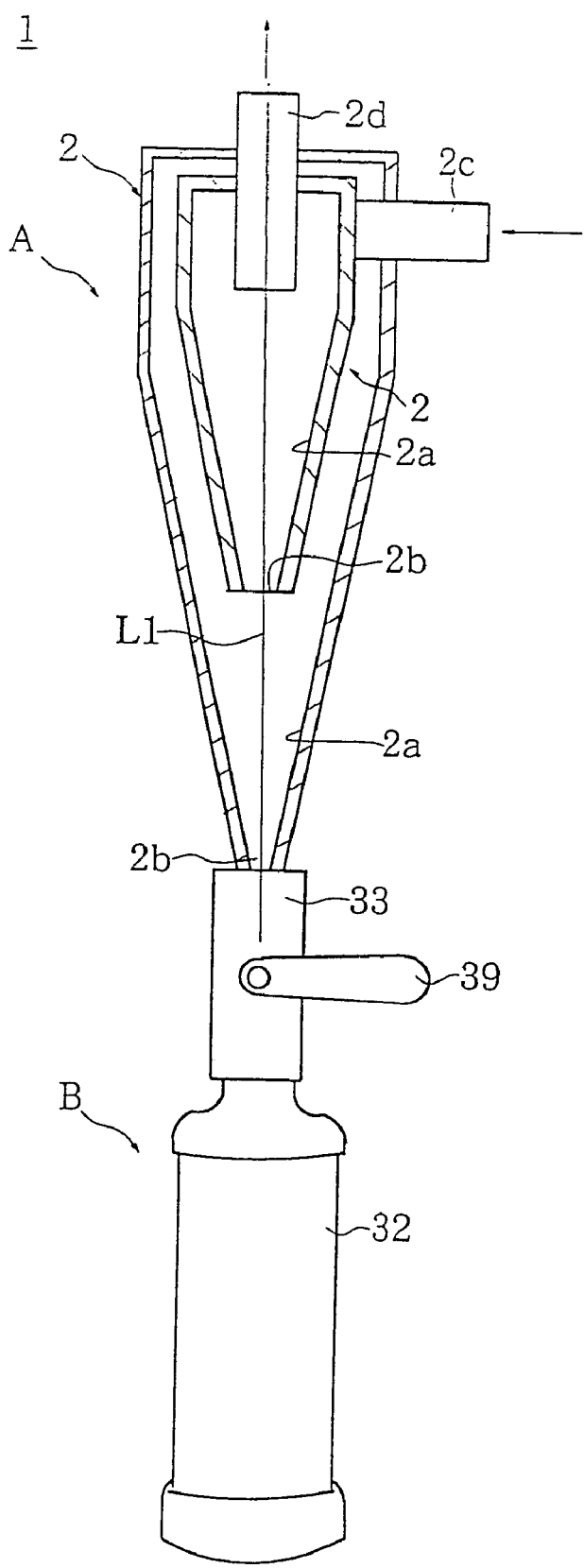
FIG. 8 is a side view of the filter portion in the filter device, in a broken diagram.

An embodiment shown in FIG. 8 will be described below. FIG. 8 is a side view of the filter portion in the filter device, in a broken diagram.

The filter device 1 in this embodiment has a construction such that the filter portion A is formed by piling up closed barrels 2 in a plurality of stages. In this embodiment, two closed barrels 2 are provided, wherein the fluid inlet 2c and the fluid outlet 2d are provided in the innermost closed barrel 2 on the uppermost stream side, and particles are allowed to sink in the outermost closed barrel 2 on the lowermost stream side.

A settlement cup 32 constituting the settlement portion B is connected to the closed barrel 2 outside of the filter portion A via a connecting pipe 33, and a switching valve 39 is provided in the connecting pipe 33. The switching valve 39 is operated manually to close when particles settled in the settlement cup 32 are taken out, to cut off the communication with the filter portion A, and the settlement cup 32 is detached from the connecting pipe 33.

In this manner, the switching valve 39 for cutting off the communication at the time of discharging the particles settled in the settlement portion B is provided on the side communicating with the filter portion A, and when the particles settled in the settlement portion B are discharged, by cutting off the communication with the filter portion A by the switching valve 39, the settled particles can be discharged without any leakage of fluid from the filter portion A.

Figure 9:
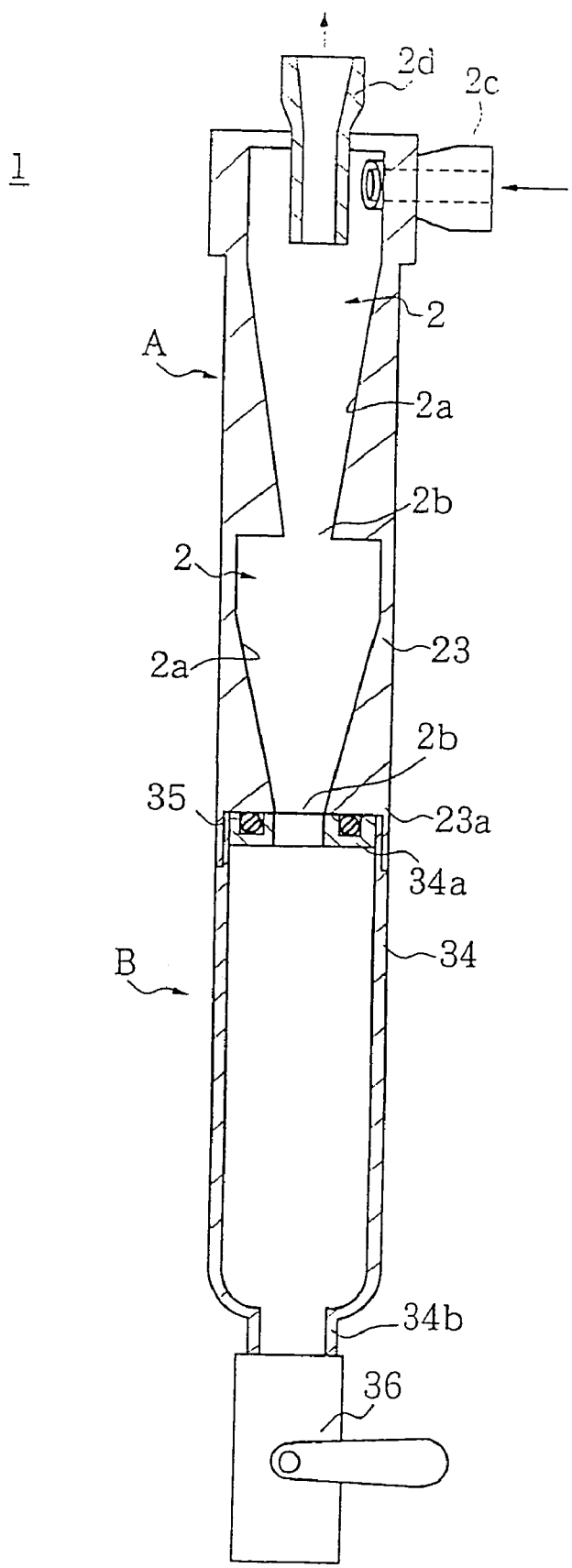
FIG. 9 is a side view of the filter portion in the filter device, in a broken diagram.
Figure 10:
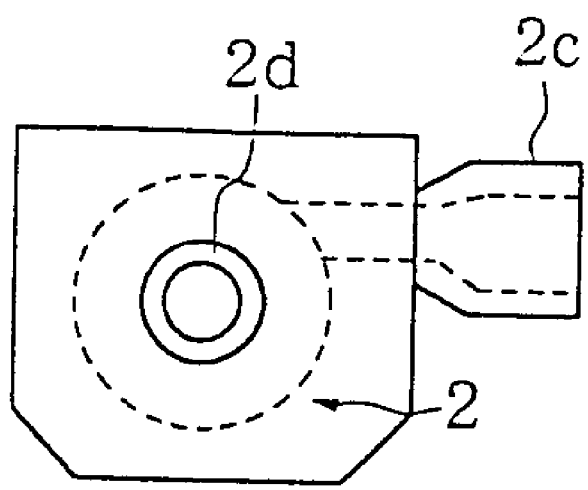
FIG. 10 is a plan view of the filter device.
Figure 11:
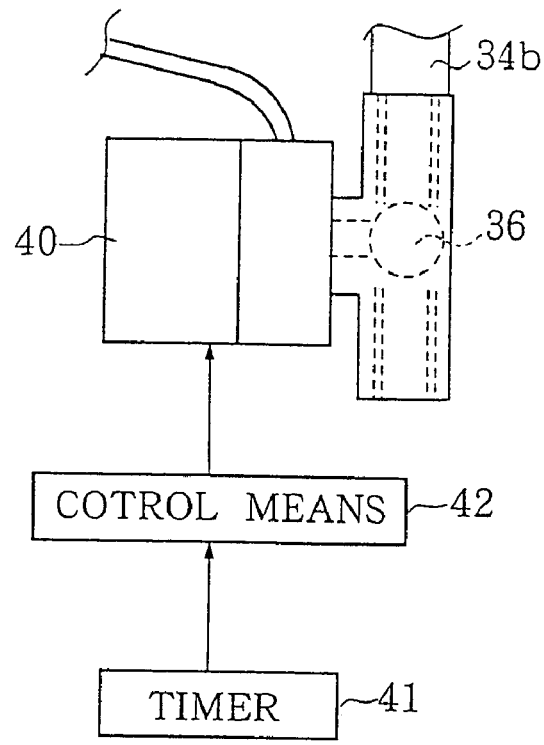
FIGS. 11(a) and (b) are side views illustrating other embodiments of a discharge valve.
Figure 11:
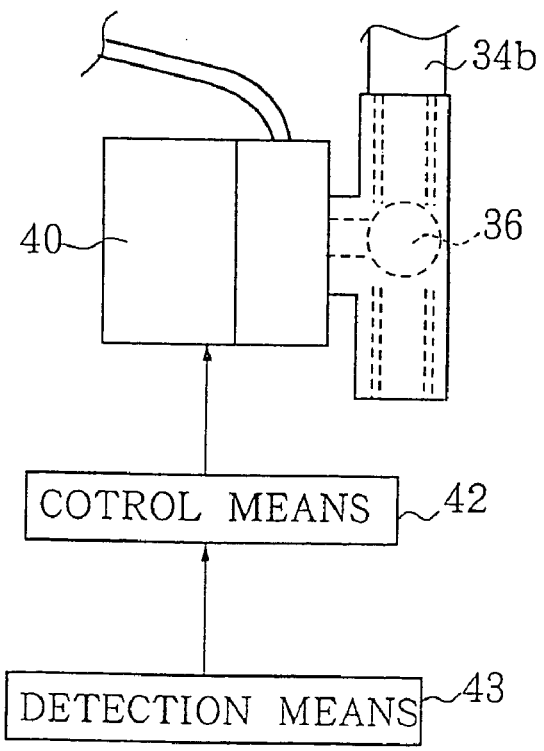

An embodiment shown in FIG. 9 to FIG. 11 will be described below. FIG. 9 is a side view of the filter portion in the filter device, in a broken diagram. FIG. 10 is a plan view of the filter device, and FIG. 11 is a side view illustrating other embodiments of the discharge valve.

In the filter portion A in the filter device 1 in this embodiment, the closed barrels 2 are provided integrally with a barrel 23, and the barrel 23 is equipped with the fluid inlet 2c and the fluid outlet 2d. In this manner, by providing the closed barrels 2 integrally with the barrel 23, the airtightness of the filter portion A can be improved.

The upper part 34a of a settlement cup 34 constituting the settlement portion B is attached to the bottom 23a of the barrel 23 via an O-ring 35, and a discharge valve 36 is provided in the bottom 34b of the settlement cup 34. The discharge valve 36 is normally closed, and is opened when particles settled in the settlement cup 34 are discharged.

The discharge valve 36 can be formed of an electromagnetic valve, as shown in FIG. 11(a). In this case, the discharge valve 36 comprises drive means 40 for opening or closing the discharge valve 36, a timer 41 for measuring the time during which the discharge valve 36 is opened, and control means 42 for controlling the drive means 40 based on the timer 41 to open the discharge valve 36 regularly. The drive means 40 is formed of a solenoid, a motor or the like, and opens or closes the discharge valve 36.

In this manner, since the control means 42 controls the drive means 40 based on the timer 41, the discharge valve 36 can be regularly opened, to discharge the particles settled in the settlement cup 34.

The discharge valve 36 may be formed of an electromagnetic valve, as shown in FIG. 11(b), and comprises drive means 40 for opening or closing the discharge valve 36, detection means 43 for detecting the settled amount of the particles, and control means 42 for controlling the drive means 40 based on the detection information from the detection means 43 to open the discharge valve 36. The detection means 43 comprises a level sensor for detecting the settled height of particles settled in the settlement cup 34, or a weight detection sensor for detecting the weight of the particles.

As described above, since the control means 42 controls the drive means 40 based on the detection information from the detection means 43, when the particles have settled up to a predetermined amount, the discharge valve 36 is opened to discharge the particles settled in the settlement cup 34.

Figure 12:
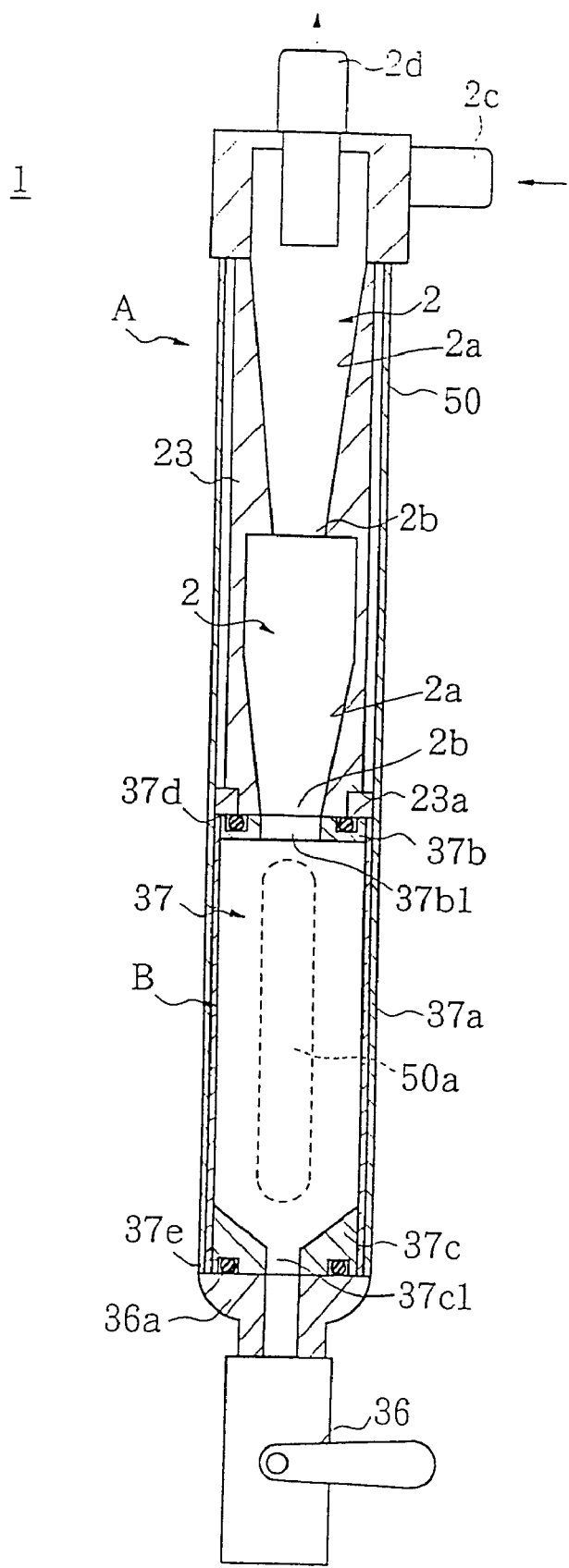
FIG. 12 is a cross section of the filter device.
Figure 13:
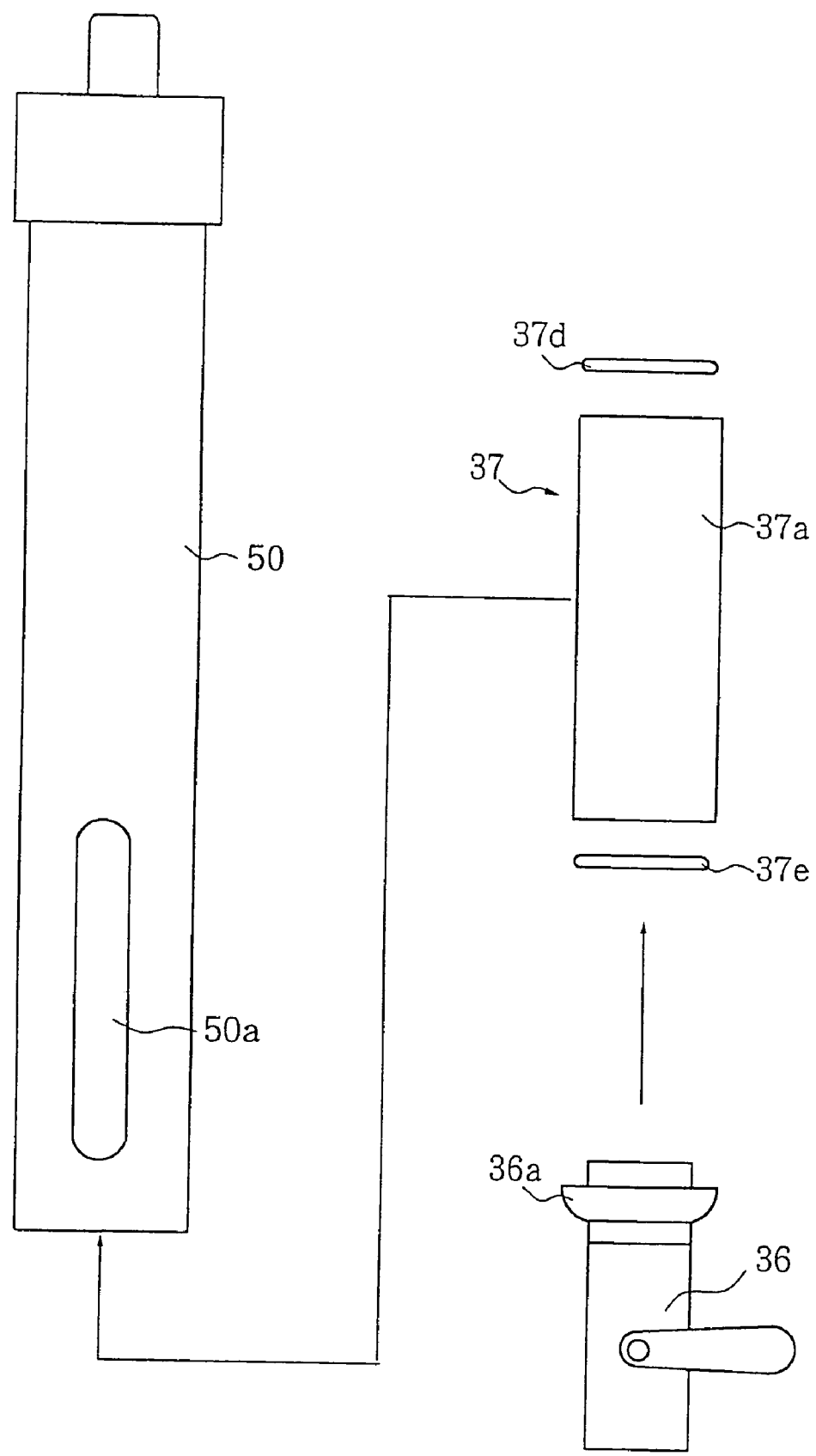
FIG. 13 is an exploded diagram of the filter device.

An embodiment shown in FIG. 12 to FIG. 14 will now be described. FIG. 12 is a cross section of the filter device, FIG.

Figure 14:
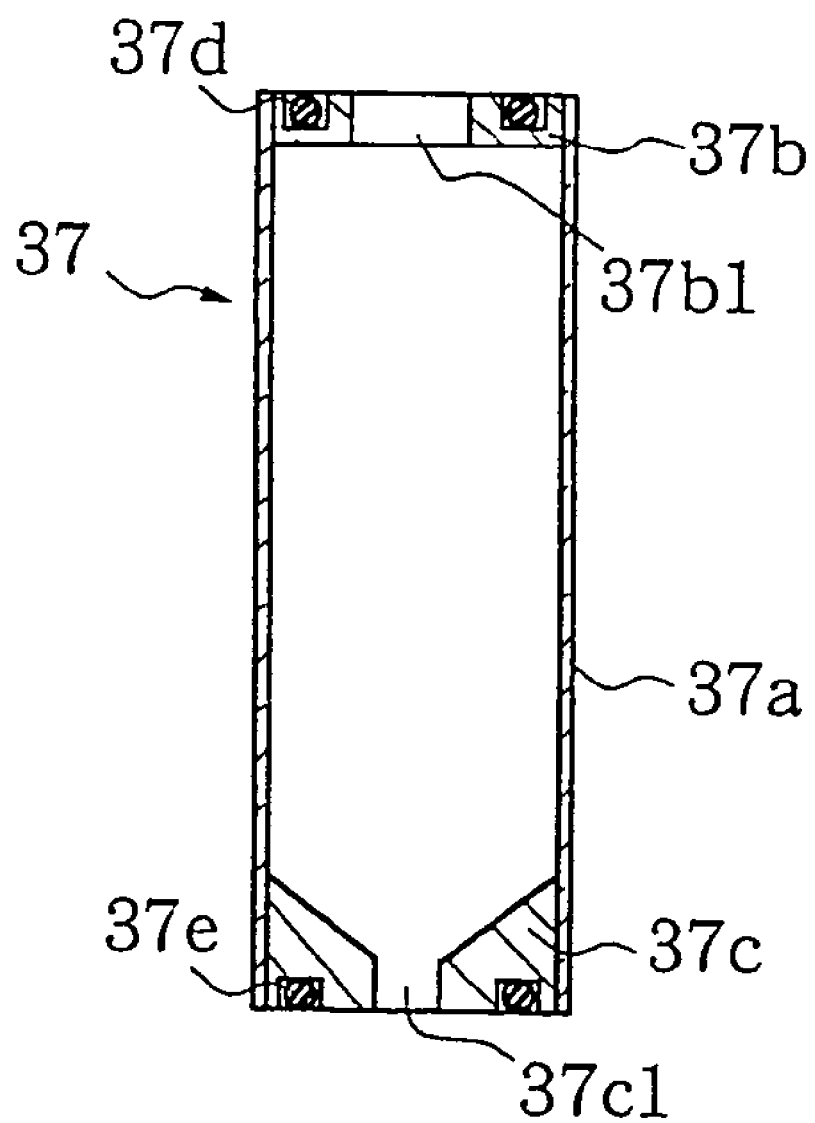
FIG. 14 is a cross section of a settlement portion.

13 is an exploded diagram of the filter device, and FIG. 14 is a cross section of a settlement portion.

In the filter device 1 in this embodiment, two closed barrels 2 constituting the filter portion A insert into an integrally formed barrel 23, and assembled to an exterior barrel 50. A settlement cup 37 constituting the settlement portion B is a cartridge type consisting of a transparent pipe 37a, an upper lid 37b having a through hole 37b1, and a lower lid 37c having a through hole 37c1. This settlement cup 37 is assembled by fitting an O-ring 37d into a concave groove in the upper lid 37b, and fitting an O-ring 37e into a concave groove in the lower lid 37c, to insert the settlement cup 37 into the exterior barrel 50.

A cap portion 36a of the discharge valve 36 is screwed to the bottom of the exterior barrel 50, and the O-ring 37e seals between the cap portion 36a and the settlement cup 37.

A long window 50a is formed in the exterior barrel 50 at a position of the settlement cup 37 in the settlement portion B. This long window 50a is formed longer in the axial direction of the exterior barrel 50, so that the settled amount of particles settled in the transparent settlement cup 37 can be visually confirmed from the long window 50a.

Figure 15:
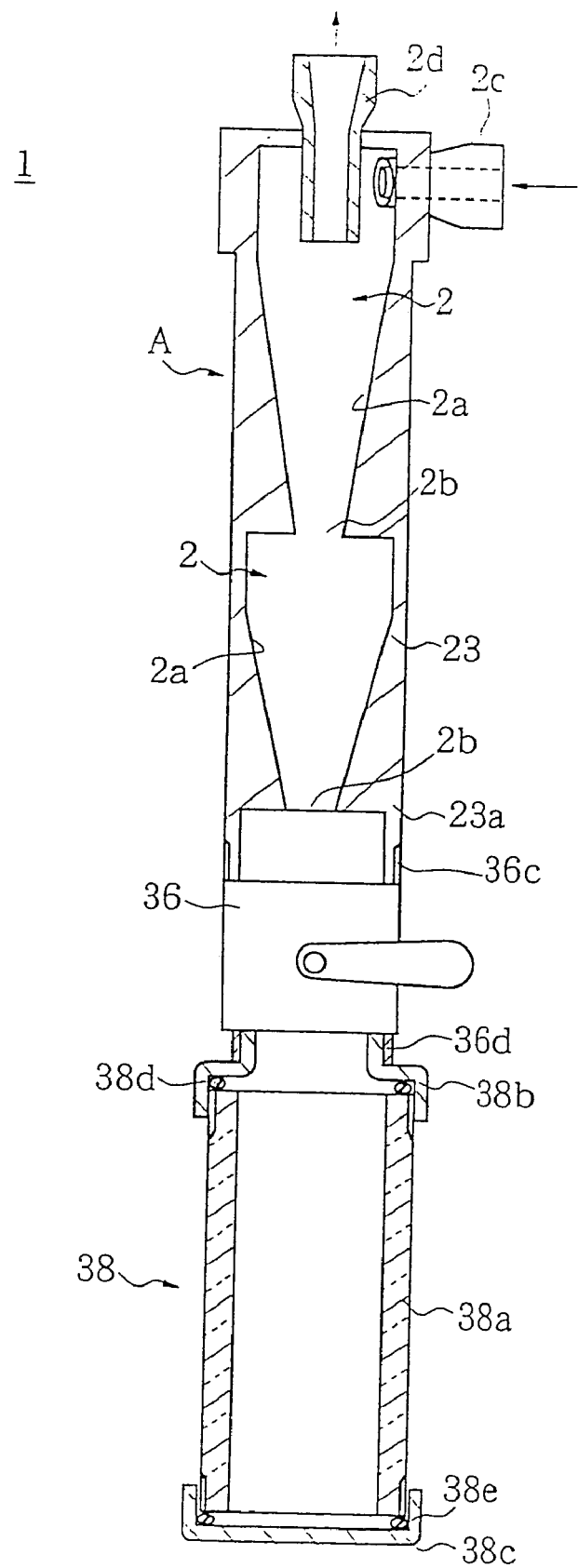
FIG. 15 is a cross section of the filter device.
Figure 16:
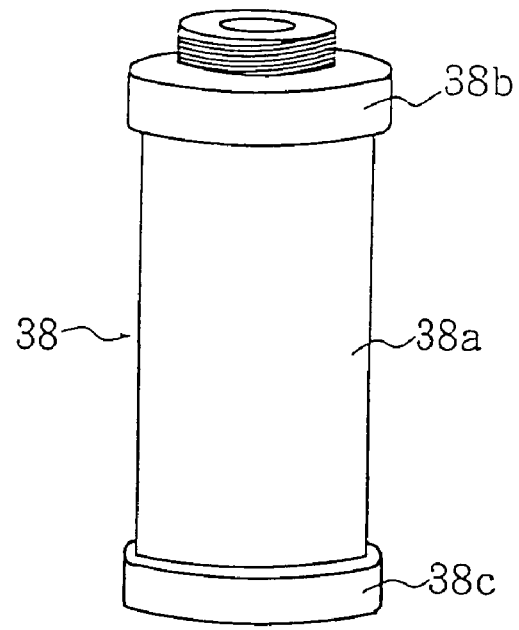
FIG. 16 is an exploded diagram of the settlement portion of the filter device.
Figure 16:
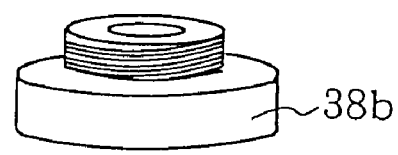
Figure 16:
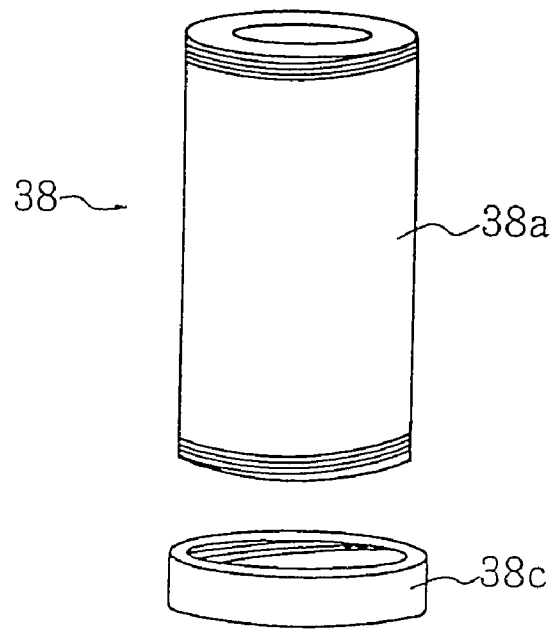

An embodiment shown in FIG. 15 and FIG. 16 will now be described. FIG. 15 is a cross section of the filter device, and FIG. 16 is an exploded diagram of the settlement portion of the filter device.

The filter portion A in the filter device 1 in this embodiment is constituted in the same manner as in the embodiment shown in FIG. 9 and FIG. 10. The settlement portion B comprises a discharge valve 36 and a settlement cup 38, and the upper part 36c of the discharge valve 36 is screwed to the bottom 23a of the barrel 23.

The settlement cup 38 comprises a transparent pipe 38a, an upper cap 38b, and a lower cap 38c. The transparent pipe 38a and the upper cap 38b are screwed via an O-ring 38d, the transparent pipe 38a and the lower cap 38c are screwed via an O-ring 38e, and the upper cap 38b is fitted to the bottom 36d of the discharge valve 36 by screwing.

The discharge valve 36 is used normally in an opened state, and the settled amount of particles settled in the transparent settlement cup 38 can be visually confirmed. In order to discharge particles from the settlement cup 38, for example, only the lower cap 38c can be detached from the transparent pipe 38a for discharging. Alternatively, the transparent pipe 38a can be detached from the upper cap 38b for discharging, with the lower cap 38c screwed to the transparent pipe 38a. Moreover, the upper cap 38b can be detached from the bottom 36d of the discharge valve 36 for discharging, with the upper cap 38b and the lower cap 38c screwed to the transparent pipe 38a.

Figure 17:
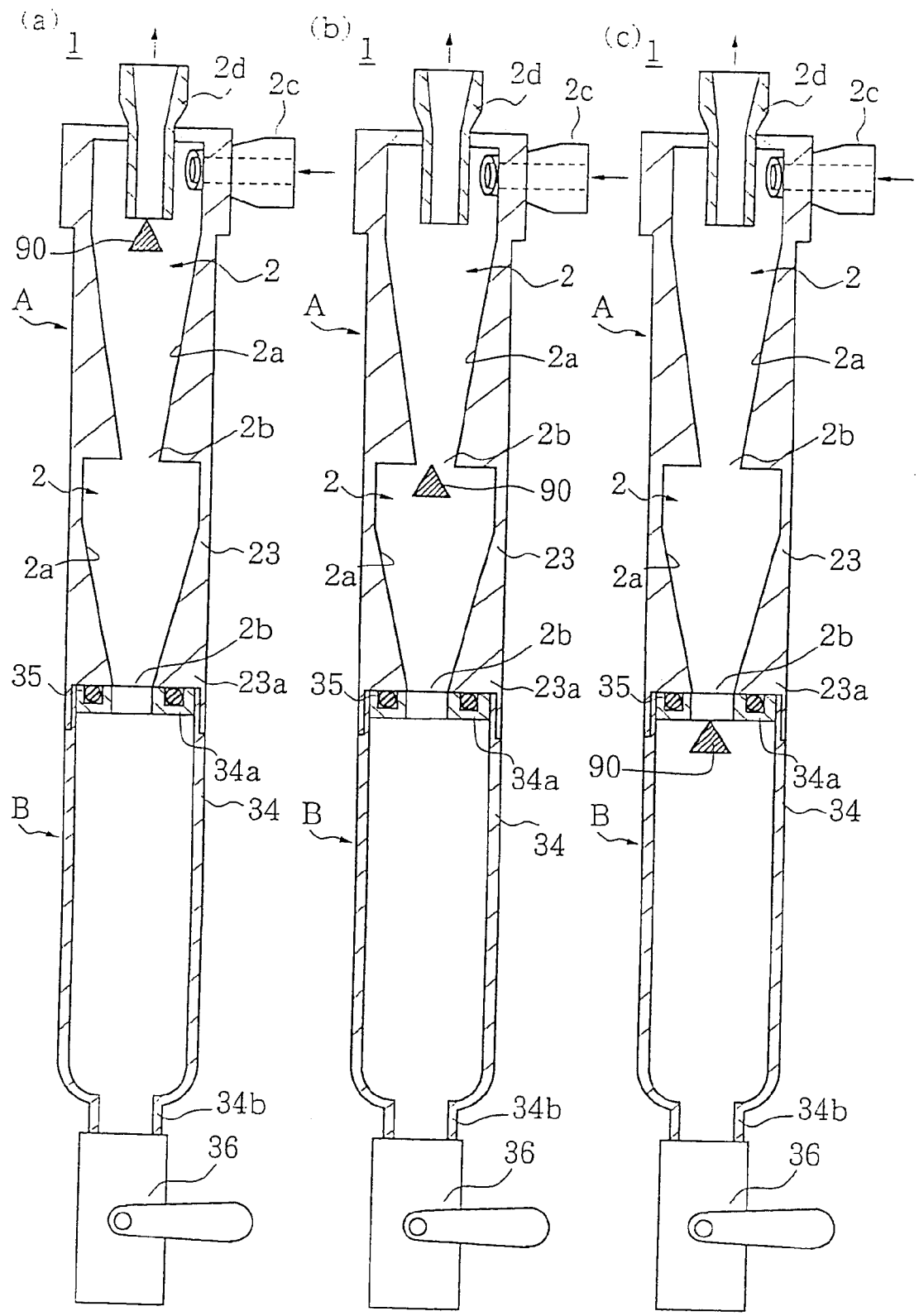
FIGS. 17(a), (b) and (c) are cross sections of the filter device.

Embodiments shown in FIG. 17 will be described next. FIG. 17 is a cross section of the filter device.

The filter portion A and the settlement portion B in the filter device 1 in this embodiment are formed in the same manner as in the embodiment shown in FIG. 9 and FIG. 10, but in this embodiment, an obstacle 90 is arranged on the axis L1 of the closed barrel in the filter portion A. In the embodiment shown in FIG. 17(a), the obstacle 90 is arranged in the closed barrel 2 on the upstream side, close to the fluid outlet 2d. In the embodiment shown in FIG. 17(b), the obstacle 90 is arranged in the closed barrel 2 on the downstream side, close to the communicating hole 2b in the closed barrel 2 on the upstream side. In the embodiment shown in FIG. 17(c), the obstacle 90 is arranged in the settlement portion B, close to the communicating hole 2b in the closed barrel 2 on the downstream side.

As described above, by arranging the obstacle 90 at any position described above on the axis L1 of the closed barrel, particles sink efficiently due to the obstacle 90, thereby improving the separation efficiency.

Figure 18:
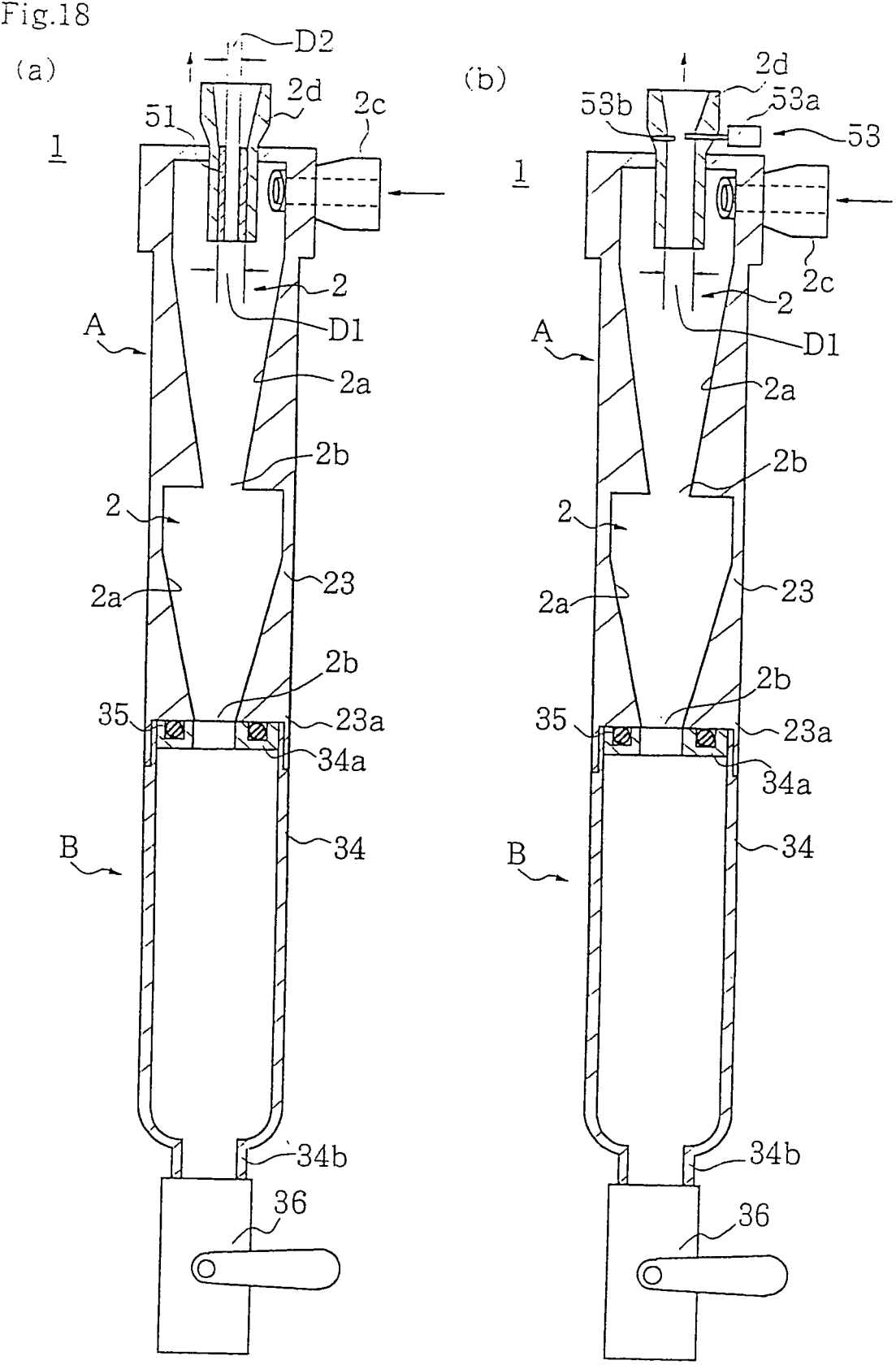
FIGS. 18(a) and (b) are cross sections of the filter device.

Embodiments shown in FIG. 18 will now be described. FIG. 18 is a cross section of the filter device.

The filter portion A and the settlement portion B in the filter device 1 in this embodiment are formed in the same manner as in the embodiment shown in FIG. 9 and FIG. 10, but in this embodiment, the caliber of the fluid outlet 2d in the filter portion A is adjustable. In the embodiment shown in FIG. 18(a), the fluid outlet 2d can be adjusted to a caliber D1 and a caliber D2, by inserting an adjusting pipe 51 into the fluid outlet 2d. In the embodiment shown in FIG. 18(b), a reducing mechanism 53 which automatically reduces the caliber D1 of the fluid outlet 2d is provided, and by rotating a dial 53a of the reducing mechanism 53 to drive a reducing vane 53b provided in the fluid outlet 2d, adjustment of the caliber D1 of the fluid outlet 2d is possible.

In the filter device 1, particles move outward from the axis L1 of the closed barrel in the filter portion A by a centrifugal force, so that no particle exists in the vicinity of the axis L1 of the closed barrel. As a result, the separated particles can be prevented from escaping from the fluid outlet 2d, thereby improving the separation accuracy and separation efficiency of the particles.

Figure 19:
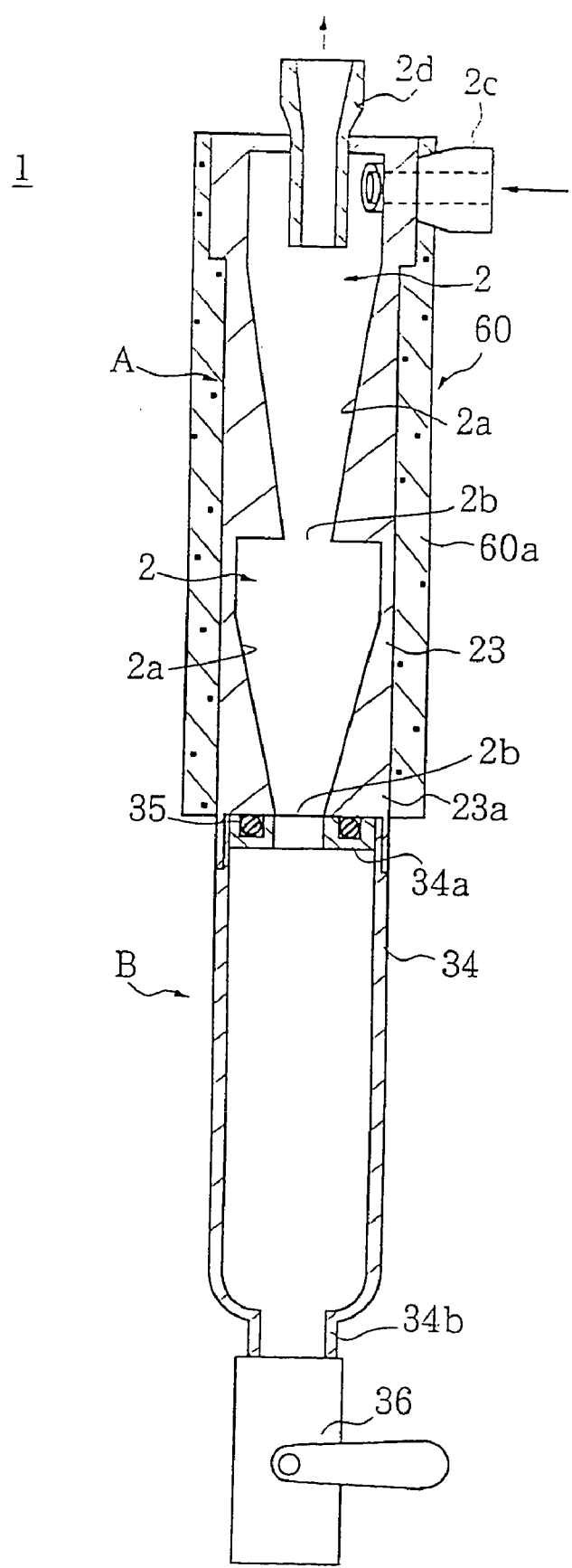
FIG. 19 is a cross section of the filter device.

An embodiment shown in FIG. 19 will now be described. FIG. 19 is a cross section of the filter device.

The filter portion A and the settlement portion B in the filter device 1 in this embodiment are formed in the same manner as in the embodiment shown in FIG. 9 and FIG. 10, but in this embodiment, the filter device 1 has heating means 60 for heating the closed barrels 2 in the filter portion A. The heating means 60 is constituted of, for example, a flexible heater 60a wound around the closed barrels 2. Since the closed barrels 2 are heated to decrease the viscosity of the fluid, the centrifugal speed increases and a difference in specific gravity can be increased, thereby improving the separation accuracy and separation efficiency of the particles.

Moreover, various germs in the fluid die out. The temperature for heating the fluid by the heating means 60 needs only to warm the fluid, but a temperature of from 0 to 200° C. is preferable.

Figure 20:
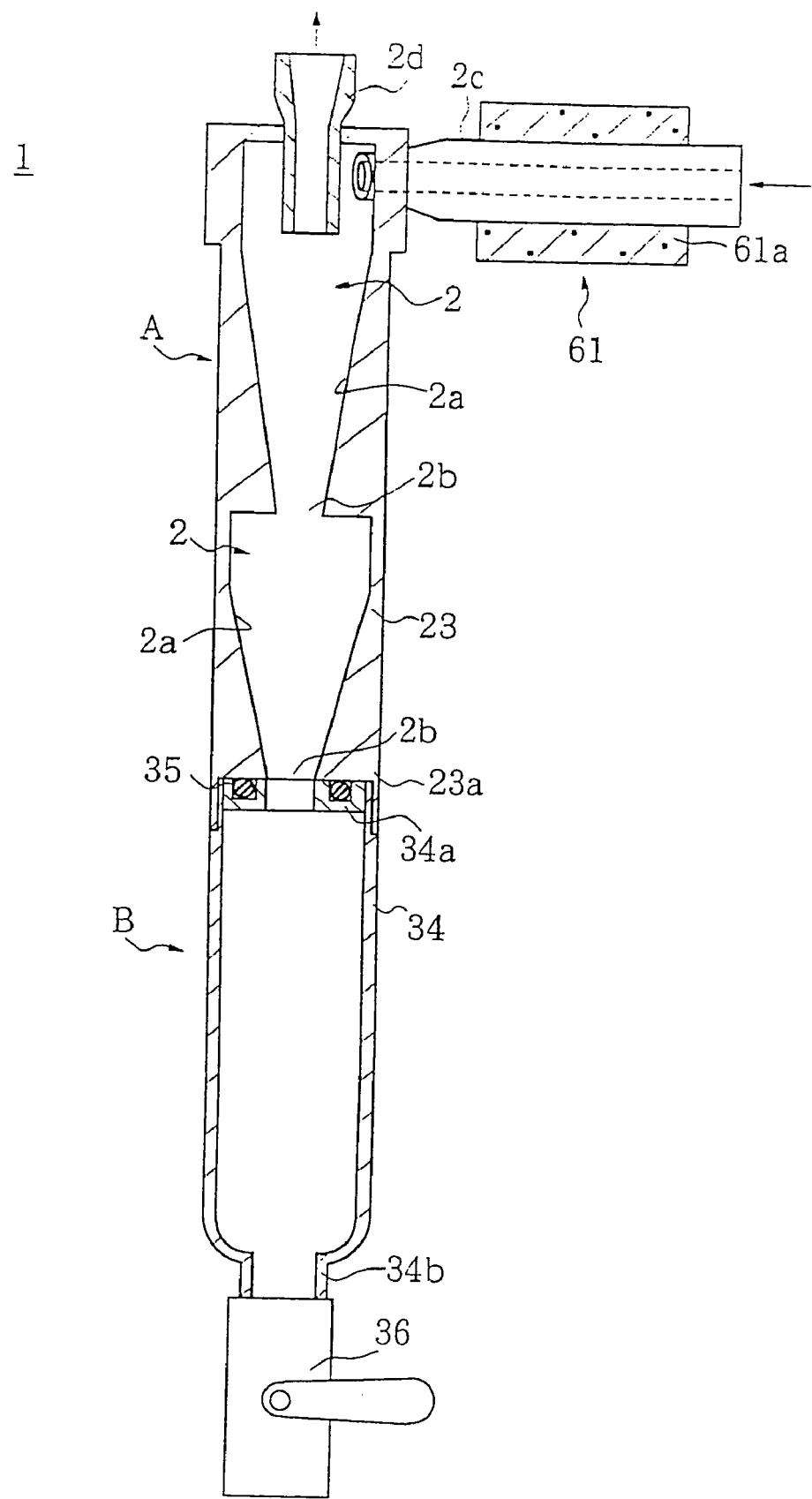
FIG. 20 is a cross section of the filter device.

An embodiment shown in FIG. 20 will be described next. FIG. 20 is a cross section of the filter device.

The filter portion A and the settlement portion B in the filter device 1 in this embodiment are formed in the same manner as in the embodiment shown in FIG. 9 and FIG. 10, but in this embodiment, the filter device 1 has heating means 61 for heating the fluid inlet 2c of the filter portion A. The heating means 61 is constituted of, for example, a flexible heater 61a wound around the fluid inlet 2c. Since the fluid inlet 2c is heated to decrease the viscosity of the fluid, the centrifugal speed increases and a difference in specific gravity can be increased, thereby improving the separation accuracy and separation efficiency of the particles.

Moreover, various germs in the fluid die out. The temperature for heating the fluid by the heating means 61 needs only to warm the fluid, but a temperature of from 0 to 200° C. is preferable.

Figure 21:
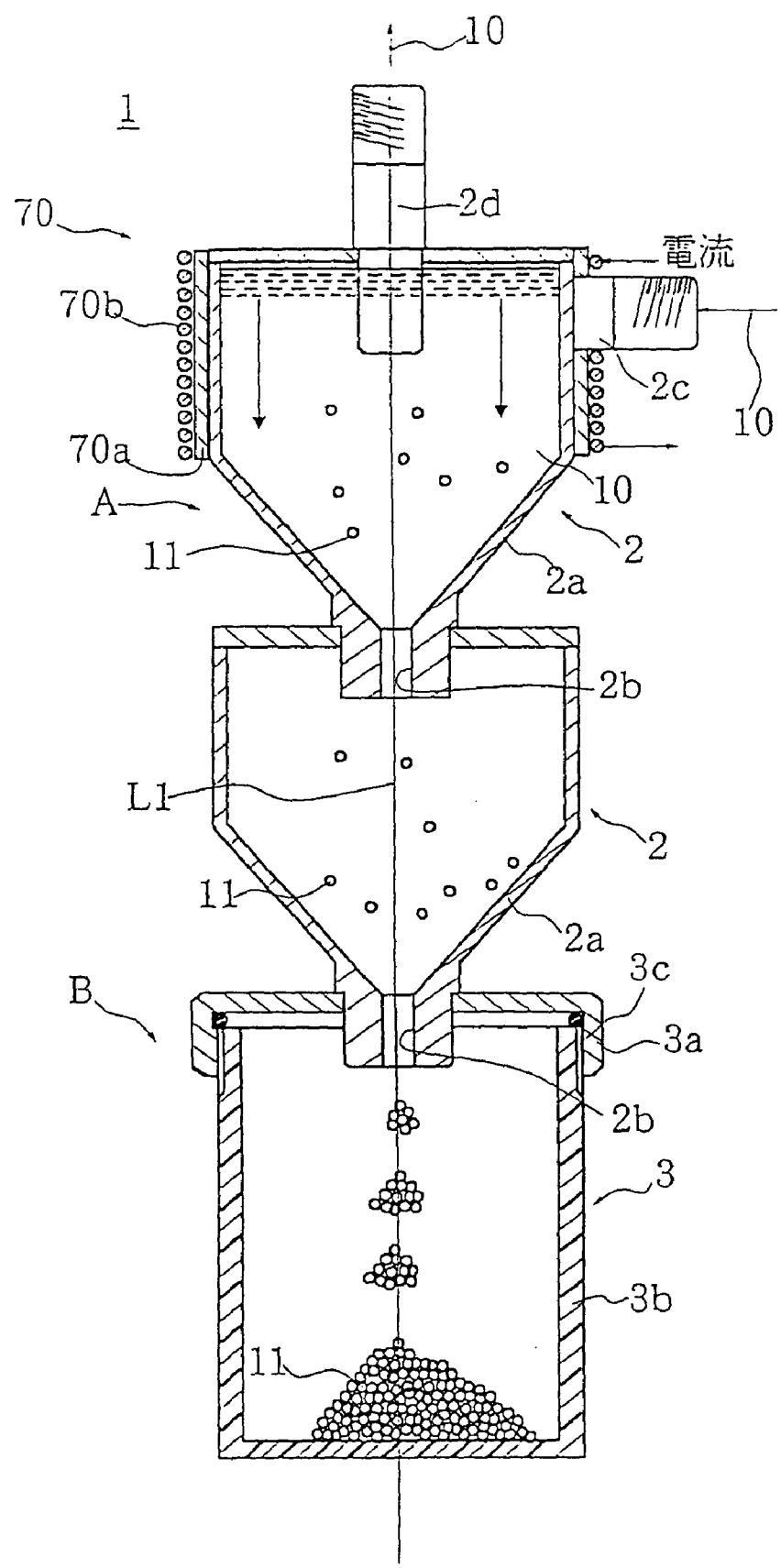
FIG. 21 is a cross section of the filter device.

An embodiment shown in FIG. 21 will be described next. FIG. 21 is a cross section of the filter device.

The filter portion A and the settlement portion B in the filter device 1 in this embodiment are formed in the same manner as in the embodiment shown in FIG. 2 and FIG. 3, but in this embodiment, the filter device 1 has magnetic force generation means 70 in the filter portion A, for giving a magnetic force for allowing the particles to sink. The magnetic force generation means 70 is constituted of an iron core 70a provided outside of the upstream closed barrel 2, and a coil 70b wound around the iron core 70a. By allowing an electric current to flow to the coil 70b of the magnetic force generation means 70, a magnetic force works on the lower side, and hence the magnetic force works in addition to the centrifugal force, thereby allowing the particles to sink and settle quickly in the settlement portion B.

Figure 22:
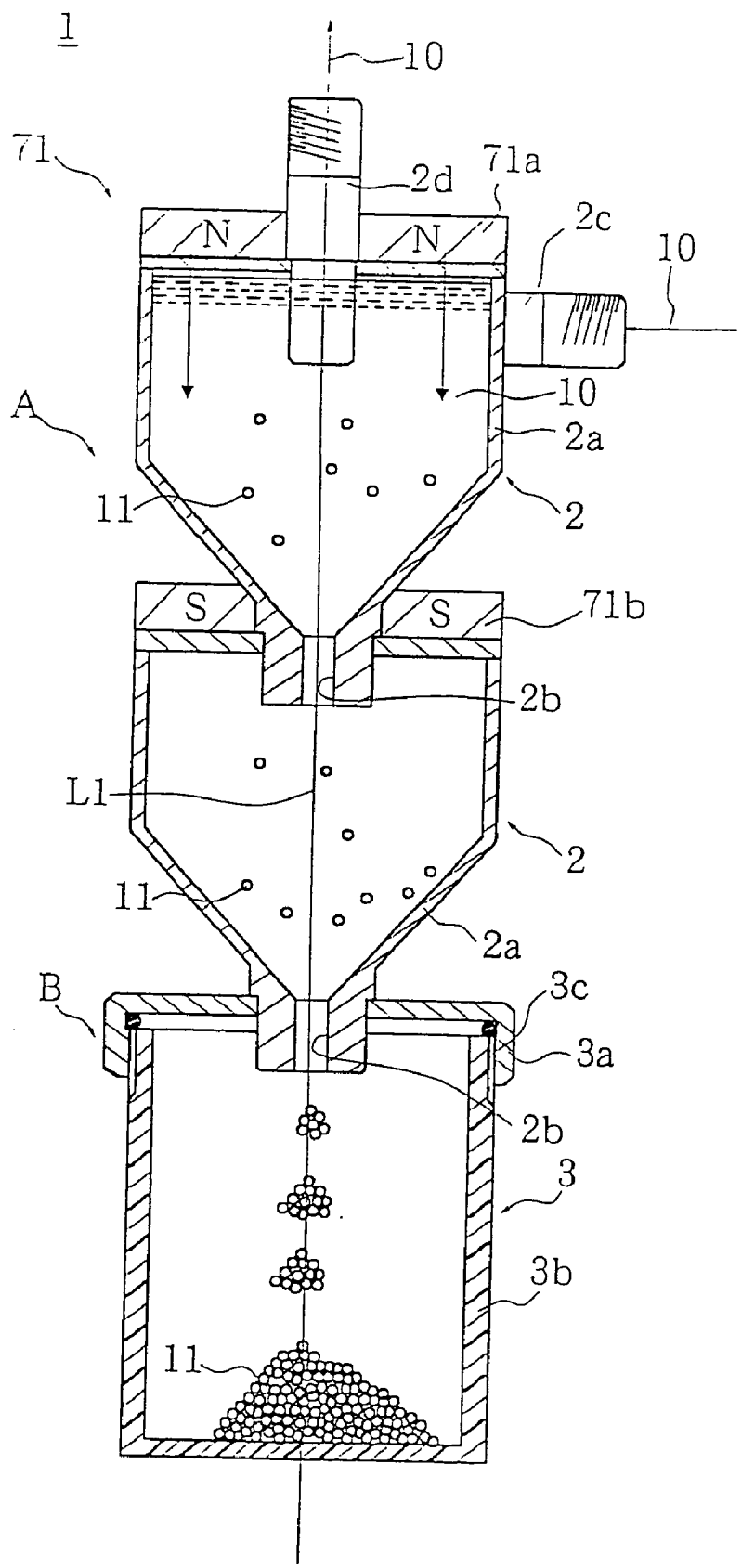
FIG. 22 is a cross section of the filter device.

An embodiment shown in FIG. 22 will be described next. FIG. 22 is a cross section of the filter device.

The filter portion A and the settlement portion B in the filter device 1 in this embodiment are formed in the same manner as in the embodiment shown in FIG. 2 and FIG. 3, but in this embodiment, the filter device 1 comprises magnetic force generation means 71 in the filter portion A, for giving a magnetic force for allowing the particles to sink. The magnetic force generation means 71 is constituted of a permanent magnet 71a provided on top of the upstream closed barrel 2, and a permanent magnet 71b provided in the lower part thereof. A magnetic force works on the lower side due to the polarities of the N pole of the permanent magnet 71a and the S pole of the permanent magnet 71b in the magnetic force generation means 71, and hence the magnetic force works in addition to the centrifugal force, thereby allowing the particles to sink and settle quickly in the settlement portion B.

Figure 23:
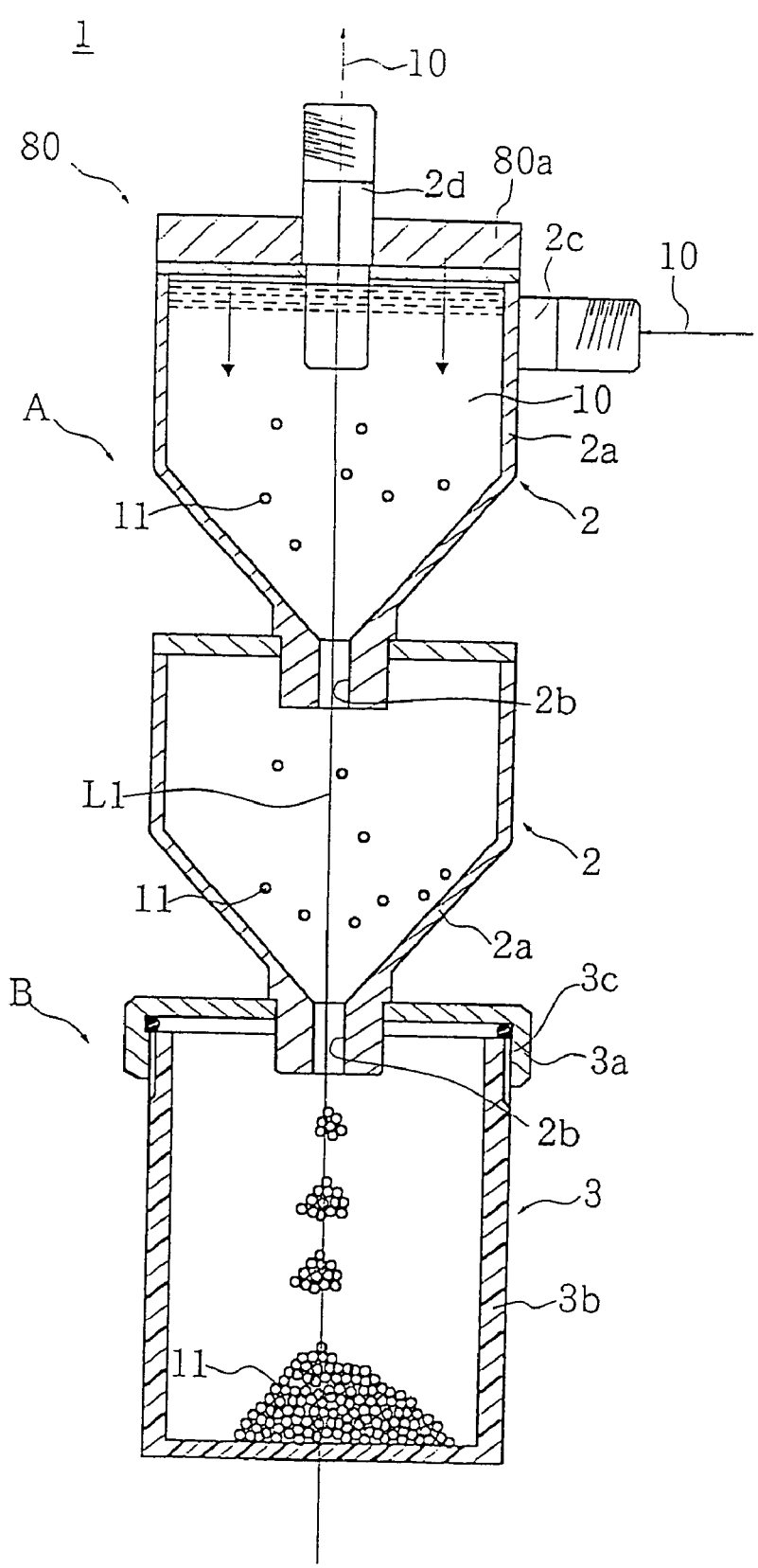
FIG. 23 is a cross section of the filter device.

An embodiment shown in FIG. 23 will be described next. FIG. 23 is a cross section of the filter device.

The filter portion A and the settlement portion B in the filter device 1 in this embodiment are formed in the same manner as in the embodiment shown in FIG. 2 and FIG. 3, but in this embodiment, the filter device 1 comprises ultrasonic wave generation means 80 in the filter portion A, for giving vibrations for allowing the particles to sink. This ultrasonic wave generation means 80 is constructed such that an ultrasonic transducer 80a is arranged on top of the upstream closed barrel 2, and vibrations for allowing the particles to sink are given by the action of the ultrasonic transducer 80a. As a result, vibrations work in addition to the centrifugal force, thereby allowing the particles to sink and settle quickly in the settlement portion B.

INDUSTRIAL APPLICABILITY

As described above, in the filter device, a fluid containing particles is supplied at a predetermined flow speed to cause swirling, and particles are separated by the centrifugal force caused by the swirling, and allowed to sink and settle, and then the fluid from which the particles are separated is discharged. As a result, a large amount of particles can be allowed to settle and be reliably removed in a short time with this small-sized and simple device. The filter device does not clog, does not need washing and exchanging work and keeps the costs low.

The invention claimed is:

1. A centrifugal separator comprising:
a separation portion including a fluid outlet at its axis and a fluid inlet at a position away from its axis, in which a cutting liquid containing cut dust is supplied at a predetermined flow speed from the fluid inlet to cause the liquid to swirl, the cut dust is moved outward in a centrifugal state and the cutting liquid from which the cut dust is separated from is discharged from the fluid outlet, and the cut dust separated by slowing down the swirling liquid is allowed to sink; and
a settlement portion in which the cut dust that has separated is allowed to settle,
wherein the separation portion is configured such that closed cylinders, each having a tapered bottom in communication through a communication hole only on its axis, are disposed integrally with a cylinder in a plurality of stages in an axial direction,
the closed cylinder at an uppermost stream stage is provided with the fluid inlet at a side away from its axis and the fluid outlet at a portion corresponding to its axis,
the closed cylinder at a lowermost stream stage communicates with the settlement portion through a communication hole only on its axis,
the settlement portion is detachable from the closed cylinder at the lowermost stream stage,
the separation portion has heating means for heating the closed cylinder and
a switching valve is provided in such a manner as to be opened or closed when the settlement portion is detachably attached onto a side communicating with the closed cylinder at the lowermost stream stage.

2. The centrifugal separator according to claim 1, wherein the settlement portion has a transparent portion, through which visual observation of the settled amount of cut dust is possible.

3. The centrifugal separator according to claim 1, wherein in the separation portion, an obstacle is axially arranged.

4. The centrifugal separator according to claim 1, wherein the caliber of the fluid outlet in the separation portion is adjustable.

5. The centrifugal separator according to claim 1, wherein the separation portion has heating means for heating the fluid inlet.

6. The centrifugal separator according to claim 1, wherein the separation portion has magnetic force generation means for providing a magnetic force for helping the cut dust to sink.

7. The centrifugal separator according to claim 1, wherein the separation portion has ultrasonic wave generation means for providing vibrations for helping the cut dust to sink.

8. A centrifugal separator comprising:
a separation portion including a fluid outlet at its axis and a fluid inlet at a position away from its axis, in which a cutting liquid containing cut dust is supplied at a predetermined flow speed from the fluid inlet to cause the liquid to swirl, the cut dust is moved outward in a centrifugal state and the cutting liquid from which the cut dust is separated from is discharged from the fluid outlet, and the cut dust separated by slowing down the swirling liquid is allowed to sink; and
a settlement portion in which the cut dust that has separated is allowed to settle,
wherein the separation portion is configured such that closed cylinders, each having a tapered bottom in communication through a communication hole only on its axis, are disposed integrally with a cylinder in a plurality of stages in an axial direction,
the closed cylinder at an uppermost stream stage is provided with the fluid inlet at a side away from its axis and the fluid outlet at a portion corresponding to its axis,
the closed cylinder at a lowermost stream stage communicates with the settlement portion through a communication hole only on its axis,
the settlement portion is fixed to the closed cylinder at the lowermost stream stage and has a discharge port, for discharging the settled cut dust, includes a discharge valve in the discharge port, and includes a switching valve on a side communicating with the closed cylinder at the lowermost stream stage for cutting off the communication when the cut dust settled in the settlement portion is discharged, wherein the separation portion has one or more of a heating means for heating the closed cylinder and means for heating the fluid inlet.

9. The centrifugal separator according to claim 8, further comprising:
drive means for opening or closing the discharge valve;
a timer for measuring a time during which the discharge valve is opened; and
control means for controlling the drive means based on the timer to open the discharge valve.

10. The centrifugal separator according to claim 8, further comprising:
drive means for opening or closing the discharge valve;
detection means for detecting the settled amount of cut dust; and
control means for controlling the drive means based on detection information from the detection means to open the discharge valve.

11. A filter device comprising:
a filter portion having a fluid outlet axially disposed at an upper location thereon and a fluid inlet disposed offset from the filter portion axis, the filter portion additionally comprising closed cylinders having tapered bottoms arranged in a plurality of stages, an upper closed cylinder being provided with the fluid inlet and fluid outlet and a heat device for heating the closed cylinders and
a settlement portion for receiving particles that settle in the filter portion, the settlement portion comprising a lid secured to the tapered bottom of the lowermost closed cylinder, screws and a cup body detachably attached to the lid by the screws,
wherein the filter portion receives a fluid containing particles at a predetermined flow speed from the fluid inlet to cause the fluid to swirl, the particles to move outwardly by centrifugal force, the fluid from which the particles are separated to discharge from the fluid outlet and the particles separated from the fluid to settle downwardly by gravity.

12. A filter device comprising:
a filter portion having a fluid outlet axially disposed at an upper location thereon, a fluid inlet disposed offset from the filter portion axis and a heating device for heating the fluid inlet, the filter portion additionally comprising closed cylinders having tapered bottoms arranged in a plurality of stages and an upper closed cylinder being provided with the fluid inlet and fluid outlet and
a settlement portion for receiving particles that settle in the filter portion, the settlement portion comprising a lid secured to the tapered bottom of the lowermost closed cylinder, screws and a cup body detachably attached to the lid by the screws,
wherein the filter portion receives a fluid containing particles at a predetermined flow speed from the fluid inlet to cause the fluid to swirl, the particles to move outwardly by centrifugal force, the fluid from which the particles are separated to discharge from the fluid outlet and the particles separated from the fluid to settle downwardly by gravity.

13. A filter device comprising:
a filter portion having a fluid outlet axially disposed at an upper location thereon and a fluid inlet disposed offset from the filter portion axis, the filter portion additionally comprising closed cylinders having tapered bottoms arranged in a plurality of stages, an upper closed cylinder being provided with the fluid inlet and a smaller cylinder having a tapered bottom is coaxially disposed within a larger closed cylinder with a tapered bottom and the fluid outlet is connected to the smaller cylinder and
a settlement portion for receiving particles that settle in the filter portion, the settlement portion comprising a lid secured to the tapered bottom of the lowermost closed cylinder, screws and a cup body detachably attached to the lid by the screws,
wherein the filter portion receives a fluid containing particles at a predetermined flow speed from the fluid inlet to cause the fluid to swirl, the particles to move outwardly by centrifugal force, the fluid from which the particles are separated to discharge from the fluid outlet and the particles separated from the fluid to settle downwardly by gravity.

14. A centrifugal separator comprising:
a separation portion including a fluid outlet at its axis and a fluid inlet at a position away from its axis, in which a cutting liquid containing cut dust is supplied at a predetermined flow speed from the fluid inlet to cause the liquid to swirl, the cut dust is moved outward in a centrifugal state and the cutting liquid from which the cut dust is separated from is discharged from the fluid outlet, and the cut dust separated by slowing down the swirling liquid is allowed to sink; and
a settlement portion in which the cut dust that has separated is allowed to settle,
wherein the separation portion is configured such that closed cylinders, each having a tapered bottom in communication through a communication hole only on its axis, are disposed integrally with a cylinder in a plurality of stages in an axial direction,
the closed cylinder at an uppermost stream stage is provided with the fluid inlet at a side away from its axis and the fluid outlet at a portion corresponding to its axis,
the closed cylinder at a lowermost stream stage communicates with the settlement portion through a communication hole only on its axis,
the settlement portion is detachable from the closed cylinder at the lowermost stream stage,
the separation portion has heating means for heating the fluid inlet and
a switching valve is provided in such a manner as to be opened or closed when the settlement portion is detachably attached onto a side communicating with the closed cylinder at the lowermost stream stage.

15. The centrifugal separator according to claim 14, wherein the settlement portion has a transparent portion, through which visual observation of the settled amount of cut dust is possible.

16. The centrifugal separator according to claim 14, wherein in the separation portion, an obstacle is axially arranged.

17. The centrifugal separator according to claim 14, wherein the caliber of the fluid outlet in the separation portion is adjustable.

18. The centrifugal separator according to claim 14, wherein the separation portion has magnetic force generation means for providing a magnetic force for helping the cut dust to sink.

19. The centrifugal separator according to claim 14, wherein the separation portion has ultrasonic wave generation means for providing vibrations for helping the cut dust to sink.

* * * * *